US008659387B2

(12) United States Patent
Nitta et al.

(10) Patent No.: US 8,659,387 B2
(45) Date of Patent: Feb. 25, 2014

(54) OPERATION PERMISSION CONTROL DEVICE AND MACHINE HAVING THE SAME MOUNTED THEREON

(75) Inventors: Shigeru Nitta, Oyama (JP); Hajime Iida, Oyama (JP); Manabu Uenosono, Hirakata (JP); Takeshi Kurokawa, Hirakata (JP); Shinichiro Okubo, Yokohama (JP); Kazuaki Ohtsuki, Yokohama (JP)

(73) Assignees: Komatsu Utility Co., Ltd., Tokyo (JP); Komatsu Ltd., Tokyo (JP)

( * ) Notice: Subject to any disclaimer, the term of this patent is extended or adjusted under 35 U.S.C. 154(b) by 1060 days.

(21) Appl. No.: 11/988,545

(22) PCT Filed: Jul. 6, 2006

(86) PCT No.: PCT/JP2006/313500

§ 371 (c)(1), (2), (4) Date: Feb. 19, 2008

(87) PCT Pub. No.: WO2007/007640

PCT Pub. Date: Jan. 18, 2007

(65) Prior Publication Data

US 2009/0128356 A1 May 21, 2009

(30) Foreign Application Priority Data

Jul. 13, 2005 (JP) ................................ 2005-204084

(51) Int. Cl.
*B60R 25/00* (2013.01)

(52) U.S. Cl.
USPC .......................... 340/5.72; 340/5.7; 340/5.74

(58) Field of Classification Search
USPC ........................ 340/825, 5.1–5.2, 5.31, 5.72, 340/572.1–572.9, 10.1–10.6, 1.1; 235/375–385
See application file for complete search history.

(56) References Cited

U.S. PATENT DOCUMENTS 4,240,516 A * 12/1980 Henderson et al. ........... 180/289
4,672,225 A * 6/1987 Hanisko et al. .............. 307/10.5

(Continued)

FOREIGN PATENT DOCUMENTS

DE 196 22 226 A1 12/1996
DE 196 44 237 A1 4/1998

(Continued)

OTHER PUBLICATIONS

Machine Translation of JP2002059811A provided with FAOM dated Feb. 24, 2011.*

(Continued)

*Primary Examiner* — James Yang
(74) *Attorney, Agent, or Firm* — Posz Law Group, PLC

(57) ABSTRACT

A function for authenticating an operator to control whether to permit them to operate a vehicle (20) can be added to the vehicle by simple modification. An operation permission control device (22) is installed on the vehicle (20). The operation permission control device (22) incorporates a relay inserted in the middle of a start signal line (47) connecting a key switch (46) and vehicle start circuit (48) (starter relay of an engine-powered vehicle or main controller of a battery-powered vehicle) and can open and close the start signal line (47). The operation permission control device (22) reads data of a authentication card (34) carried by the operator, collates the read data with preprogrammed data in a removable set memory a (32). If the data match, the device connects the start signal line (47) to enable start of the vehicle. A vehicle code of one vehicle (20) and codes of a plurality of operators are registered in the set memory (32) by a vehicle management device (26), and a code of a single operator and codes of a plurality of vehicles can be registered in the authentication card (34).

6 Claims, 7 Drawing Sheets

(56) References Cited

U.S. PATENT DOCUMENTS

| | | | | |
|---|---|---|---|---|
| 5,412,378 | A * | 5/1995 | Clemens | 340/5.6 |
| 5,508,693 | A | 4/1996 | Wake | |
| 5,661,473 | A * | 8/1997 | Paschal | 340/10.1 |
| 7,034,658 | B2 * | 4/2006 | Hayashi et al. | 340/5.72 |
| 7,061,367 | B2 * | 6/2006 | Mosgrove et al. | 340/5.21 |
| 7,259,679 | B2 * | 8/2007 | Yoshida et al. | 340/572.8 |
| 7,671,724 | B2 * | 3/2010 | Mori et al. | 340/426.36 |
| 2002/0130769 | A1 * | 9/2002 | Yamagishi | 340/426 |
| 2002/0133716 | A1 * | 9/2002 | Harif | 713/201 |
| 2004/0162695 | A1 | 8/2004 | Tanaka | |
| 2004/0222699 | A1 * | 11/2004 | Bottomley | 307/9.1 |
| 2005/0099265 | A1 * | 5/2005 | Dix et al. | 340/5.72 |

FOREIGN PATENT DOCUMENTS

| | | | |
|---|---|---|---|
| DE | 196 50 048 | A1 | 6/1998 |
| DE | 100 18 762 | A1 | 1/2002 |
| DE | 102 43 318 | A1 | 4/2004 |
| EP | 0 610 902 | A1 | 8/1994 |
| JP | 59-171723 | A | 9/1984 |
| JP | 01-147998 | A | 6/1989 |
| JP | 03-176252 | A | 7/1991 |
| JP | 05-092748 | A | 4/1993 |
| JP | 2000-270387 | A | 9/2000 |
| JP | 2000-351598 | A | 12/2000 |
| JP | 2001-082010 | A | 3/2001 |
| JP | 2002-059811 | A | 2/2002 |
| JP | 2002059811 | A * | 2/2002 |
| JP | 2003-137070 | A | 5/2003 |
| JP | 2004-189424 | A | 7/2004 |
| JP | 2004-189451 | A | 7/2004 |
| JP | 2005-076327 | A | 3/2005 |

OTHER PUBLICATIONS

Machine Translation in English of the Detailed Description of JP 2002059811 A.*

Office Action issued Oct. 12, 2009 for corresponding German patent application No. 10 2006 001 714.4-51 (English translation enclosed).

* cited by examiner

OPERATION PERMISSION CONTROL DEVICE AND MACHINE HAVING THE SAME MOUNTED THEREON

TECHNICAL FIELD

The present invention relates to a device for controlling whether to allow a specified person to operate a vehicle or other machines and to a machine having the device mounted thereon.

BACKGROUND ART

Control technology of this kind has been disclosed in patent documents 1 to 4.

According to the disclosure of patent document 1, a fingerprint recognition device is mounted on a forklift. The operator has their own fingerprint read by the fingerprint recognition device after turning ON the key switch of the forklift. The fingerprint recognition device judges whether the fingerprint is legitimate. The judgment result of the fingerprint recognition device is reported to the control unit in the forklift. The control unit permits operation by turning on the power of the forklift when a judgment result to the effect that the fingerprint is legitimate is received.

According to the disclosures of patent documents 2 and 3, a person with a forklift operator qualification possesses an IC tag that indicates that they are a licensed person. This IC tag is fitted into the person's work shoes, for example. The forklift is provided with a communication antenna which is for wirelessly communicating with the IC tag and which is connected to the control controller in the forklift. When the key switch of the forklift is ON, the power of the control controller in the forklift is ON and the control controller attempts to detect the IC tag via the communication antenna. If the IC tag is detected, this means that a licensed person has boarded and, therefore, the control controller turns on a relay for opening and closing the output signal line of the key switch to turn ON the power of the forklift to permit operation thereof.

According to the disclosure of patent document 4, a memory is fitted into the operation key of construction machinery and an authentication code is stored in the memory. When the key switch is turned ON as a result of the operator inserting an operation key in the key switch of the construction machinery, the control device in the construction machinery reads the authentication code from the memory in the operation key and compares the authentication code with an authentication code that was pre-stored by the control device. If the result of the comparison is a match, the control device validates the power ON signal output by the key switch to turn ON the power of the construction machinery and enables an engine start by turning ON the relay that opens and closes the line of the starter signal from the key switch.

[Patent Document 1] Japanese Application Laid Open No. 2000-351598

[Patent Document 2] Japanese Application Laid Open No. 2004-189424

[Patent Document 3] Japanese Application Laid Open No. 2004-189451

[Patent Document 4] Japanese Application Laid Open No. 2001-82010

DISCLOSURE OF THE INVENTION

According to the above prior art, the control device in the vehicle receives the authentication result of the fingerprint recognition and code comparison and exercises control with respect to whether power ON or engine start of the vehicle is permitted. As a result, there is a need for the control device in the vehicle to have a function (circuit or program) for performing operation permission control from the outset. However, there is also a need to add the same function by means of simple modification to an old type of vehicle in which a control function of this kind is not originally installed.

A large number of people, vehicles and machines operate in a large-scale work area. In such a facility, needs such as where there is the desire to allow a plurality of workers to operate one vehicle or machine or where one worker is to be allowed to operate a plurality of vehicles or machines exist. However, technology that sufficiently satisfies such needs is not disclosed in patent documents 1 to 4.

Furthermore, in the case of the conventional device of patent document 1, although a fingerprint authentication device is required, this is costly and delicate. This problem is not found with the conventional devices appearing in patent documents 2 and 3. However, in the case of the conventional devices appearing in patent documents 2 and 3, when a third party illegally obtains or counterfeits and uses an authentication tool which should be in the possession of a legitimate operator such as an IC tag or operation key, operation is deceptively permitted. Accordingly, a defensive capability, which makes it possible to oppose action to illegally obtain or counterfeit an authentication tool which should be in the possession of a legitimate operator, is desirable.

Therefore, an object of the present invention is to allow the same functions to be added by means of simple modification to a machine that does not possess an operation permission control function.

A further object of the present invention is to make it possible to flexibly set the assignment between people and machines where a particular person is provided with operation qualifications for a particular machine.

Yet another object of the present invention is to improve the defensive capability to defend against action to illegally obtain or counterfeit an authentication tool which should be in the possession of a legitimate operator.

The operation permission control device according to the present invention is attached to a machine that has operating means to be operated by an operator and starting means for starting the machine in response to the operating means, and exercises control of whether operation of the machine is permitted. The casing of the operation permission control device is separate from the machine and can be attached to the machine. A control circuit is provided in the casing. The control circuit comprises opening and closing means that is inserted in a signal line for transmitting a signal that causes the starting means to operate from the operating means of the machine to the starting means. In addition, the control circuit is capable of communicating with a portable recording medium owned by the operator, receives recorded data from the portable recording medium, and performs authentication processing by using the data. Further, the control circuit operates the opening and closing means to close the signal line in accordance with the result of the authentication processing. As a result, the machine can be started by closing the signal line only in cases where authentication is successful.

In a preferred embodiment, the operating means of the machine is a key switch in the case of vehicle and the starting means is a starter relay in the case of an engine-driven vehicle or a main controller in the case of a battery-powered vehicle. However, these are merely illustrations and, in specific terms, the correspondence of particular circuits with these means may differ depending on the specific configuration of the machine.

The operation permission control device according to the present invention can be retrofitted in a machine which does not originally possess an operation permission control function. Further, the operation permission control function can be added to this machine simply by effecting relatively straightforward modification of the wiring by introducing the above signal line in the machine into the operation permission control device.

According to a preferred embodiment, operator codes for a plurality of operators and a machine code for at least one machine are settable in the operation permission control device as machine's part authentication data. On the other hand, an operator code for at least one operator and machine codes of a plurality of machines are settable in the portable recording medium as operator's part authentication data. Further, the operation permission control device performs authentication processing by judging whether a match is obtained between the machine's part authentication data and the operator's part authentication data. Hence, the assignment of operation qualifications between people and machines where a plurality of people are provided with operation qualifications for one machine or one person is provided with operation qualifications for a plurality of machines can be performed flexibly.

According to a preferred embodiment, the portable recording medium comprises a setting storage medium which is separated from the portable recording medium. This setting storage medium is a removable recording medium which is attachable to and detachable from the operation permission control device. Further, the operation permission control device performs the authentication processing only in cases where the setting storage medium is attached to the operation permission control device. Hence, when the setting recording medium is removed from the operation permission control device, because authentication cannot be performed, the machine is unable to start even when a third party attempts to illegally operate the machine with only the portable recording medium. Thus, the defensive capability against action to illegally use the portable recording medium is high.

Alternatively, as a modified example, the configuration may be such that, in the authentication processing, a recording medium for storing data which are compared with data from the portable recording medium is attached securely to the operation permission control device and arbitrary data are writable, rewritable, or erasable to and from the recording medium by using wireless communications from a remote device. In such a case, authentication fails and the machine is unable to start even when the third party only has the portable recording medium and attempts to operate the machine illegally by remotely manipulating the data in the recording medium in the operation permission control device. Accordingly, the defensive capability with respect to the action of illegally using the portable recording medium is high. Further, as another modified example, a configuration in which the operation permission control device is inserted via electromagnetic coupling in the abovementioned starting signal line in the machine can also be employed. As a result, the defensive capability against malicious action where an attempt is made to operate a machine illegally by 'directly linking' the starting signal line in which the operation permission control device is inserted improves.

According to a preferred embodiment, means that uses an operator code for which a match has been obtained in the authentication processing to create usage history data indicating which operator has used the machine and which records the usage history data is also provided in the operation permission control device. As a result, the results of the authentication processing for operator permission control are put to practical use and the automatic recording of the usage history which is useful in task management can be performed and, therefore, convenience improves.

The operation permission control device of the present invention can be attached by means of simple modification to a machine that does not originally possess a function for operation permission control and this function can accordingly be retroactively added.

In addition, according to a preferred embodiment, it is possible to flexibly set the assignment of operation qualifications between people and machines where a particular person is provided with operation qualifications for a particular machine.

Furthermore, according to a preferred embodiment, the defensive capability against the illegal procurement or counterfeiting of the authentication tool which should be in the possession of a legitimate operator can be improved.

LIST OF ELEMENTS

Figure 1:
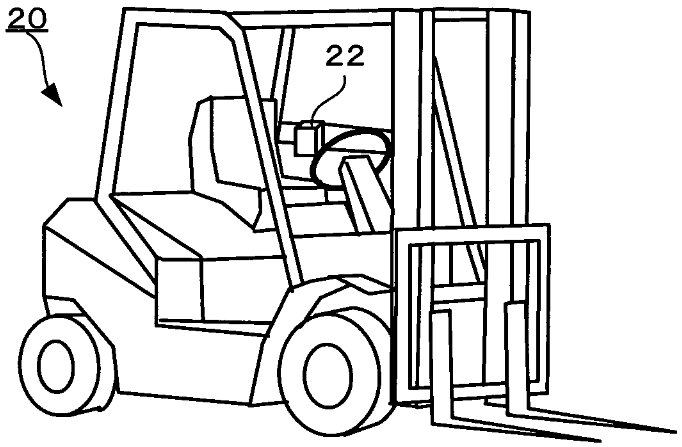
FIG. 1 is a perspective view of the outer appearance of the machine (a forklift, for example) whereon the operation permission control device according to one embodiment of the present invention is mounted.

20 Vehicle (Forklift)
22 Operation permission control device
24 Vehicle main body
25 Cable
26 Vehicle management device
32 Setting memory
34 Authentication card
44 Battery (power source of vehicle 20)
46 Key switch
47 Start signal line
48 Vehicle starting circuit

50 CPU unit
52 Setting memory interface
54 Authentication card
56 Starting control relay
60 Engine starter
64 Starter relay
66 Start signal line
70 Vehicle main controller
77 Start signal line
80 Inverter
82 First transformer
83 Relay converter
84 Second transformer
86 Rectifier
100 Operator code
102 Vehicle code
104 Expiration date data
110 Operator code
112 Vehicle code
114 Expiration date data
120 Timer
122 Current date and time data
144 Protective cover

BEST MODE FOR CARRYING OUT THE INVENTION

Although there are no particular restrictions on the type of machine to which the present invention can be applied, representative examples are vehicles and, in particular, industrial vehicles, construction vehicles, automobiles, and so forth which are started and whose power is turned ON as a result of the operator operating a key switch. An embodiment of the present invention which is applied to such a vehicle will be described hereinbelow by way of an example.

FIG. 1 provides an external view of a machine in which the operation permission control device according to one embodiment of the present invention is mounted.

As shown in FIG. 1, the operation permission control device 22 according to the present invention is secured in a vehicle 20 (a forklift, for example). The location for attaching the operation permission control device 22 on the vehicle 20 is desirably a location that is straightforward for the operator to operate the operation permission control device 22 such as a suitable location in the cabin. The operation permission control device 22 is a device for exercising control to allow a legitimate qualified person to operate the vehicle 20. That is, the operation permission control device 22 first performs operator authentication when the operator inserts the operation key into the key switch of the vehicle 20 to start the vehicle 20 and exercises control to allow the vehicle 20 to be started only when the authentication is successful and to make it impossible to start the vehicle 20 when the authentication fails.

Here, to 'start' vehicle 20 means to place the vehicle 20 in a state where the vehicle is able to perform operations which fulfill its purpose (travel or loading operations, for example). For example, the transmission of power to the various electrical circuits of the vehicle 20 in response to an ON signal from the key switch can constitute 'starting' of vehicle 20. However, although merely an illustration in this embodiment, 'starting' of vehicle 20 indicates the starting of the engine as a result of the starter motor being made to turn in response to a start signal from the key switch in the case of an engine-driven vehicle and, in the case of a battery-powered vehicle, 'starting' of vehicle 20 indicates the transmission of power to the main controller in the vehicle 20 (this drives and controls the travel motor and loading and unloading work motor and so forth) in response to the start signal from the key switch.

Further, the operation permission control device 22 is a separate device from the main body of the vehicle 20 and is housed in an individual casing which is separate from the vehicle 20. The operation permission control device 22 is attached in a detachable state using screws or the like in a predetermined location in the vehicle 20 and is electrically connected to a predetermined electrical circuit in the vehicle via electrical cables. By retrofitting the operation permission control device 22 to the vehicle 20 even when the circuit in the vehicle 20 does not originally comprise an operation permission function, the operation permission control function can be added to the vehicle 20.

The operation permission control device 22 does not operate independently and, in addition to being connected to a predetermined electrical circuit in the vehicle 20 and cooperating therewith, is employed in association with a few peripheral devices which are disposed in locations separate from the vehicle 20. The whole system, which comprises the operation permission control device 22, the predetermined electrical circuit in the vehicle 20 and the abovementioned peripheral devices, will be known as a 'operation permission control system' in this specification.

Figure 2:
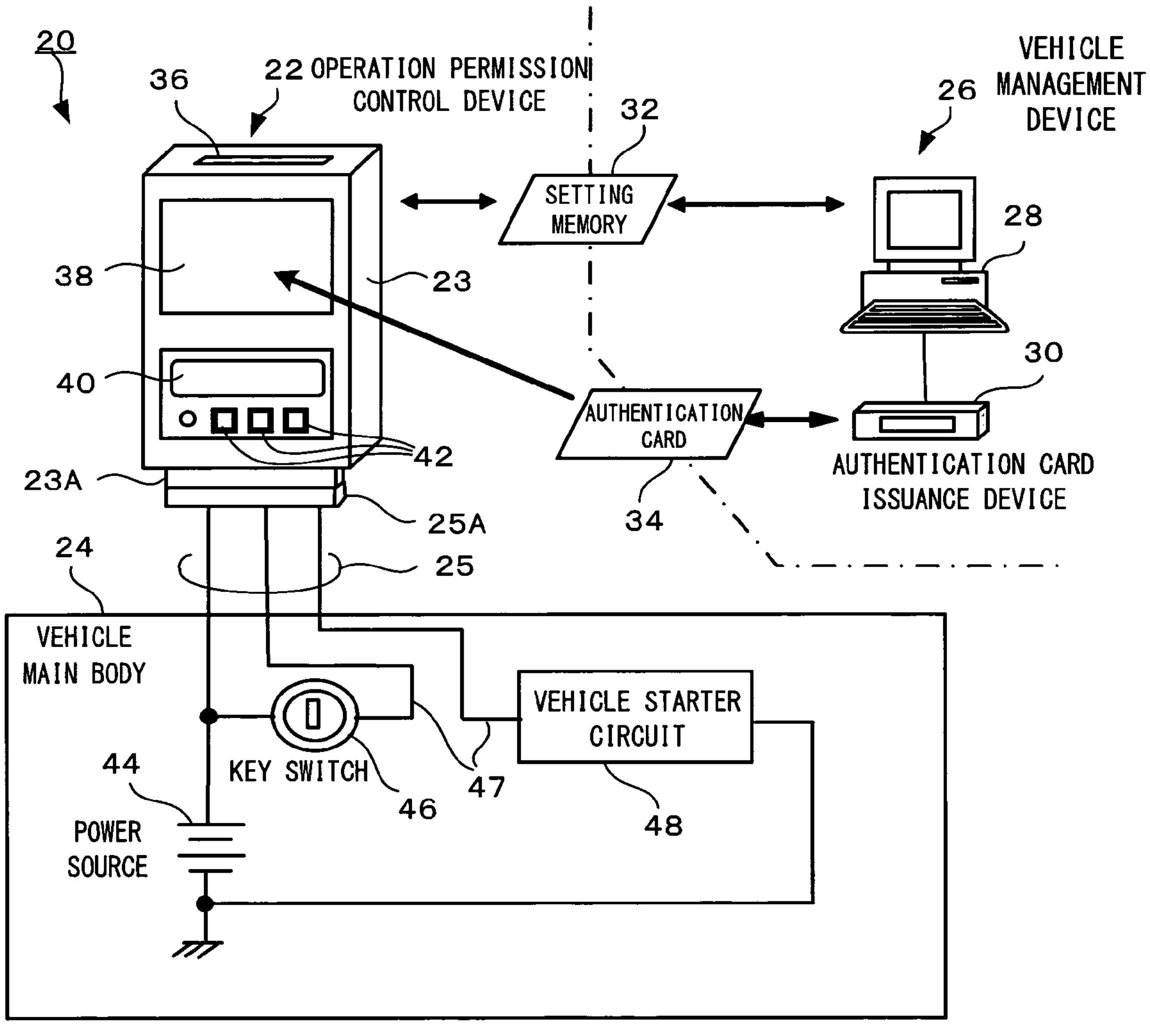
FIG. 2 shows the overall configuration of an operation permission control system which comprises an operation permission control device 22, an in-vehicle electrical circuit and other peripheral devices.

FIG. 2 shows the overall configuration of the operation permission control system.

In FIG. 2, parts which are shown to the left of the dot-chain line are the parts which are mounted in the vehicle 20. The vehicle mount section includes an operation permission control device 22 and predetermined electrical circuits 44, 46, and 48 in the vehicle main body 24 which is originally mounted in the vehicle 20. The parts shown to the right of the dot-chain line in FIG. 2 are parts which are completely separate from the vehicle 20. Such parts include a vehicle management device for managing information on the vehicle 20 and operator (not shown). A vehicle management device 26 comprises, for example, a personal computer 28 that is installed in an office, and an authentication card issuance device 30 for creating an authentication card 32 (described subsequently) which is connected to the personal computer 28.

In addition, this system includes a setting memory 32 and authentication card 34 which are carried by a person. The setting memory 32 is a component of the operation permission control device 22 on the vehicle 20. The authentication card 34 is owned by the operator. The setting memory 32 and authentication card 34 have authentication data which are used when the operation permission control device 22 carries out operator authentication recorded thereon. That is, the setting memory 32 stores vehicle's part authentication data with content which is specific to the vehicle 20 recorded thereon (the specific content of the vehicle's part authentication data will be described subsequently). The authentication card 34 stores operator's part authentication data with content which is specific to the operator who owns the authentication card 34 recorded thereon (the specific content of the vehicle's part authentication data will be described subsequently).

The setting of vehicle's part authentication data for the setting memory 32 (writing and rewriting) is carried out by the vehicle management device 26. After the vehicle's part authentication data have been set, the setting memory 32 is mounted in the operation permission control device 22. The setting memory 32 is a removable and rewritable data recording medium (a flash memory card, for example) and can accordingly be freely attached and detached to and from the operation permission control device 22.

Meanwhile, the authentication card 34 is a rewritable data recording medium (an RFID card or IC card, for example) which is portable and able to communicate with the operation permission control device 22 (capable of contactless short-range wireless communication, for example) and is owned by the operator. The authentication card 34 is issued by an authentication card issuance device 30 of the vehicle management device 26 and records operator's part authentication data which are output by the vehicle management device 26. The authentication card 34 thus issued is owned by the operator assigned by the operator's part authentication data which is recorded on the authentication card 34.

Further, although only one vehicle 20 is shown in FIG. 2, a plurality of vehicles 20 may exist. In this case, one operation permission control device 22 is mounted in each vehicle 20 and a setting memory 32 in which vehicle's part authentication data specific to each vehicle 20 is set is fitted in each operation permission control device 22. Further, a plurality of operators may exist and each operator owns at least one authentication card 34 which stores operator's part authentication data which are specific to each operator.

The operation permission control device 22 is a separate component from the vehicle main body 24 and has an individual casing 23, the casing 23 housing a control circuit with a configuration that will be described subsequently with reference to FIGS. 3, 4 and 5. As already described, the casing 23 of the operation permission control device 22 is attached at a suitable location of the vehicle main body 24 using screws in a detachable state. The upper side of the casing 23 of the operation permission control device 22 is provided with a memory insertion slot 36 so that the setting memory 32 can be mounted on or removed from the operation permission control device 22 via the memory insertion slot 36. The front side of the casing 23 is provided with a communication antenna pad 38 and, when the authentication card 34 is held close to the communication antenna pad 38, the authentication card 34 is driven by the magnetic waves from the communication antenna pad 38, whereby contactless short-range wireless communication is carried out via the communication antenna pad 38 between the operation permission control device 22 and authentication card 34 so that the operator's part authentication data in the authentication card 34 are read by the operation permission control device 22. Further, the front side of the casing 23 is provided with a liquid-crystal display 40 and a few operation buttons 42. The liquid-crystal display 40 displays instruction messages from the operation permission control device 22 to the operator and authentication results, and so forth. Furthermore, the operation buttons 42 are used by the operator to turn ON the power of the operation permission control device 22 or to perform time setting of the timer which is installed in the operation permission control device 22.

Moreover, the underside of the casing 23 of the operation permission control device 22 is provided with an electrical connector 23A which is an interface for the operation permission control device 22 with the vehicle main body 24. Meanwhile, the electrical cable 25 is drawn out from the vehicle main body 24 and the tip of the electrical cable 25 is provided with an electrical connector 25A which is an interface for the vehicle main body 24 with the operation permission control device 22. The electrical connector 25A from the vehicle main body 24 and the electrical connector 23A of the operation permission control device 22 are linked and, consequently, the operation permission control device 22 is electrically connected to the electrical circuits 44, 46, and 48 in the vehicle main body 24.

The operation permission control device 22 receives a supply of drive power from the battery 44 in the vehicle main body 24. The interior of the operation permission control device 22 is provided with a timer (not shown) for counting the current date and time and this timer is backed up by a timer cell (not shown) which is incorporated in the operation permission control device 22. Hence, even when the supply of power from the vehicle main body 24 is stopped, a continuous operation can be maintained for a period which is sufficiently long for practical purposes (a few years, for example).

In the vehicle main body 24, there are a battery 44, a key switch 46, and a vehicle starter circuit 48, or the like, as electrical circuit elements which are connected to the operation permission control device 22. The battery 44 is the power source of the vehicle 20. As mentioned earlier, the battery 44 is also used as the power source of the operation permission control device 22. The vehicle starter circuit 48 is a circuit for starting the vehicle 20 and examples in this embodiment are a starter relay for starting up the starter motor in the case of an engine-driven vehicle and a vehicle main controller in the case of a battery-powered vehicle.

The key switch 46 is normally used by general industrial vehicles, construction machinery and automobiles and can be set to an OFF position, ON position, and start position depending on the operation of the operation key which is inserted in the key switch 46. When the key switch 46 is in the OFF position, the vehicle 20 is in the power OFF state and, in this state, the majority of the electrical circuits in the vehicle 20 are unable to receive a supply of power from the battery 44 and are inoperable. When the key switch 46 is in the ON position, the vehicle 20 is in the power ON state and the majority of the electrical circuits in the vehicle 20 are then either operating as a result of receiving a supply of power from the battery 44 or are able to receive a supply of power and operate. When the key switch 46 is in the start position, a start signal for starting the vehicle 20 is output from the key switch 46 to the start signal line 47.

The start signal line 47 from the key switch 46 passes from the vehicle main body 24 via the cable 25 and enters the operation permission control device 22 and then leaves the operation permission control device 22 via the cable 25 to return to the vehicle main body 24 for a connection to the vehicle starter circuit 48. A circuit for controlling whether to transmit a start signal to the vehicle starter circuit 48 by opening and closing the start signal line 47 (referred to as a 'start control circuit' hereinbelow) is provided in the operation permission control device 22. The operation permission control device 22 normally places the start signal line 47 in an open state and, in this state, the start signal is unable to enter the vehicle starter circuit 48 even when the key switch 46 reaches the start position and it is therefore impossible to start the vehicle 20. The operation permission control device 22 closes the start signal line 47 so that the start signal is able to enter the vehicle starter circuit 48 only in cases where operator authentication has been successful. Accordingly, the vehicle 20 can be started only in cases where authentication is successful.

Further, in cases where the vehicle 20 is a conventional-type of vehicle which is not originally provided with an operation permission control function, the start signal line 47 from the key switch 46 is originally directly connected to the vehicle starter circuit 48. With this type of vehicle 20, an operation permission control function can be added by retrofitting the operation permission control device 22 by performing relatively simple electrical wire-related modification in which the start signal line 47 is disconnected, an additional supply line is drawn from the battery 44, and this line is linked to cable 25, and so forth.

In a system with the above hardware configuration, the control functions and operations which the vehicle management device 26 and operation permission control device 22 have and carry out are as follows.

(1) The vehicle management device 26 comprises a database which stores an operator code or codes identifying one or more operators respectively, a vehicle code or codes identifying one or more vehicles respectively, assignment data indicating which operator is assigned the operation qualification of which vehicle, expiration date data indicating the expiration dates of the operation qualifications assigned to the respective operators, and usage history data indicating which operator has operated each vehicle and at what time. The vehicle management device 26 possesses functions for registering, changing, and erasing the various data in the database in accordance with instructions from the administrator.

(2) The vehicle management device 26 has a function for receiving an instruction from the administrator and writing, rewriting, or erasing vehicle's part authentication data which are specific to a certain vehicle 20 in the setting memory 32 for the certain vehicle 20. Vehicle's part authentication data which are specific to a certain vehicle 20 include the vehicle code of the vehicle 20, the operator codes of one or a plurality of operators to whom the operation qualifications of the vehicle 20 have been assigned, and expiration date data for the operation qualifications of the vehicle 20 assigned to the respective operators.

(3) The vehicle management device 26 has a function for receiving an instruction from the administrator and writing, rewriting, or erasing operator's part authentication data which are specific to a certain operator to and from the authentication card 34 for the certain operator. Vehicle's part authentication data which are specific to a certain operator include the operator code of the operator, the vehicle codes of one or a plurality of vehicles whose operation qualifications are assigned to the operator, and expiration date data of the operation qualifications which the operator has been assigned. The surface of the authentication card 34 may also provide a character display of the content of the vehicle's part authentication data which are stored in the authentication card 34.

(4) When a predetermined operation button 42 of the operation permission control device 22 is pushed, the power of the operation permission control device 22 is turned ON. After the power of the operation permission control device 22 has been turned ON, the operation permission control device 22 starts control processing. In the control processing, the operation permission control device 22 reads operator's part authentication data from the authentication card 34 when the authentication card 34 is in the vicinity of the antenna pad 38. The operation permission control device 22 compares the operator code and vehicle code of the operator's part authentication data read from the authentication card 34 with the operator code and vehicle code of the vehicle's part authentication data recorded in the installed setting memory 32. The operation permission control device 22 also compares the current date and time that has been counted by the built-in timer with the expiration date of the operator's part authentication data and vehicle's part authentication data. If, as a result of the comparison is that a match is obtained for the operator code and vehicle code between the operator's part authentication data and vehicle's part authentication data and the current date and time has not exceeded both expiration dates, the operation permission control device 22 judges that authentication has been successful and allows the vehicle 20 to be started by closing the start signal line 47. In other cases, the operation permission control device 22 leaves the start signal line 47 open to render starting of the vehicle 20 impossible.

(5) The control processing mentioned in (4) can be executed for the first time in a state where the setting memory 32 has been attached to the operation permission control device 22 (that is, a state where the vehicle's part authentication data are saved in the operation permission control device 22). Therefore, when the setting memory 32 has been removed from the operation permission control device 22 (that is, when the vehicle's part authentication data have been erased from the operation permission control device 22), because the vehicle 20 cannot be started with the authentication card 34 alone, it is possible to oppose foul play such as the illegal procurement or counterfeiting of the authentication card 34 by a third party.

(6) After enabling the starting of the vehicle 20 as mentioned earlier, the operation permission control device 22 monitors whether the vehicle 20 has been started (whether the engine has actually started, for example). After the vehicle 20 has actually started, the operation permission control device 22 monitors whether the usage of the vehicle 20 has ended (whether the key switch 46 has returned to the OFF position or whether the engine has stopped or the power of the vehicle 20 has been has been turned OFF, for example). Based on this monitoring result, the operation permission control device 22 creates usage history data which indicates by which operator and from what time until what time the vehicle 20 has been used and writes the usage history data in the installed setting memory 32.

(7) Upon sensing that usage of the vehicle 20 has ended, the operation permission control device 22 writes the usage history data to the setting memory 32 and then turns the power of the operation permission control device 22 OFF automatically. When the power of the operation permission control device 22 has been turned OFF, the start signal line 47 naturally enters a state of being open. Thereafter, the operator is unable to re-start the vehicle 20 unless the operator turns the power of the operation permission control device 220N once again and perform the authentication successfully.

(8) The vehicle management device 26 is able to receive an instruction from the administrator and read usage history data that have been recorded in the setting memory 32 which has been removed from the operation permission control device 22, store and manage the usage history data in the database, and display and print out the usage history data stored in the database.

The configuration and operation of the operation permission control device 22 will be described specifically hereinbelow.

Figure 3:
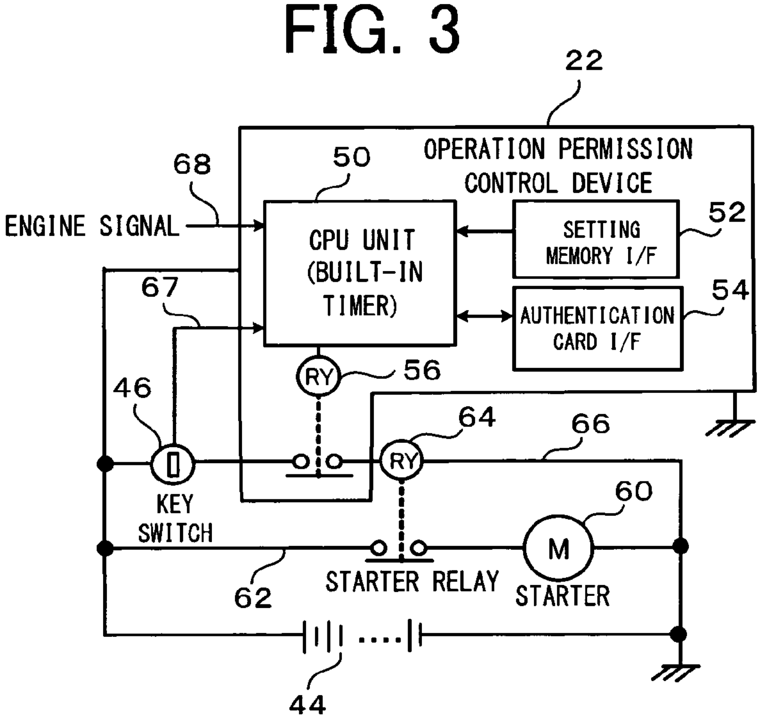
FIG. 3 shows an example of the connection between the configuration of the interior of the operation permission control device 22 and an electrical circuit in the vehicle 20 in a case where vehicle 20 is an engine-driven vehicle.
Figure 4:
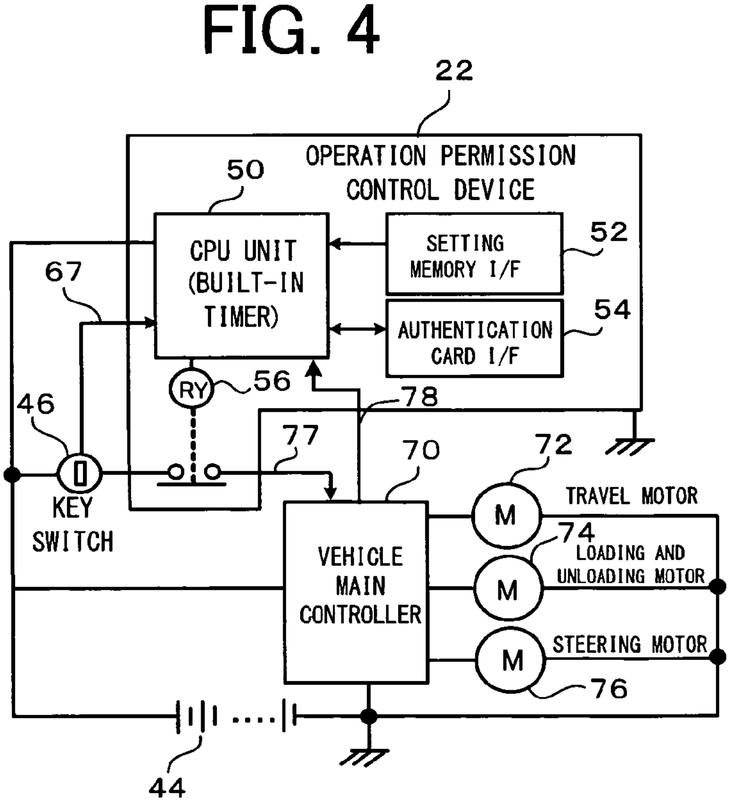
FIG. 4 shows an example of the configuration of the interior of the operation permission control device 22 and the connection with an electrical circuit in vehicle 20 in a case where vehicle 20 is a battery-powered vehicle.

FIGS. 3 and 4 each show examples of the configuration of the interior of the operation permission control device 22 and the connection with an electrical circuit in the vehicle 20, where FIG. 3 represents a case where vehicle 20 is an engine-driven vehicle and FIG. 4 represents a case where vehicle 20 is an battery-powered vehicle.

In the configuration example of the case of an engine-driven vehicle shown in FIG. 3, the operation permission control device 22 comprises a CPU unit 50, a setting memory interface 52, an authentication card interface 54, and a start control relay 56. The setting memory interface 52 performs data communications with respect to the setting memory 32 under the control of the CPU unit 50. The authentication card interface 54 comprises the antenna pad 38 shown in FIG. 2 and performs data communications with respect to the authentication card 34 under the control of the CPU unit 50.

The start control relay 56 is inserted midway along the start signal line 66 for transmitting a start signal from the key switch 46 to a starter relay 64 (corresponds to the vehicle starter circuit 48 shown in FIG. 2) and opens and closes the start signal line 66 under the control of the CPU unit 50. The start signal line 66 is open in a state where the start control relay 56 is not energized. In this example, the start signal line 66 is a drive current line for supplying a drive current to the starter relay 64.

The CPU unit 50 is a programmed microcomputer which contains the above timer (not shown) and normally counts the current date and time. When the power of the operation permission control device 22 is ON, the CPU unit 50 reads vehicle's part authentication data and operator's part authentication data from the setting memory 30 and authentication card 34 via the setting memory interface 52 and authentication card interface 54 and acquires the current date and time data from the built-in timer, and performs authentication processing by using these data. If the authentication is successful, the CPU unit 50 energizes the start control relay 56 in order to establish an ON state. When the start control relay 56 is in an ON state, the start signal line 66 closes. Therefore, the start relay 62 is able to turn ON when the key switch 46 has reached the start position, thereby rotating the starter 60 to start the engine (now illustrated).

In addition, the CPU unit 50 inputs a key ON signal 67 which indicates that the key switch 46 is in the ON position or OFF position and an engine signal 68 which indicates whether the engine has stopped or is rotating from the vehicle 20 via predetermined electrical signal lines (although wiring for these electrical signal lines is required when the vehicle 20 is modified, this is also relatively simple wiring work). The CPU unit 50 recognizes the start of usage or end of usage of vehicle 20 based on the key ON signal 67 and engine signal 68, creates usage history data based on the recognition result, and writes the usage history data to the setting memory 32 via the setting memory interface 52. In a case where the end of usage is recognized, the CPU unit 50 automatically turns OFF the power of the operation permission control device 22 after the writing of the usage history data is complete. As a result, the start control relay 56 enters an OFF state, the start signal line 66 opens, and, accordingly, the engine enters a state where the engine is unable to start even when the key switch 46 is in the start position.

In the configuration example of the case of a battery-powered vehicle shown in FIG. 4, the configuration and functions of the operation permission control device 22 itself are the same as those of the case of the engine-driven vehicle shown in FIG. 3. However, in the case of the battery-powered vehicle, when a start signal is output from the key switch 46, the start signal is input to the vehicle main controller 70 to turn ON the power of the vehicle main controller 70 so that the vehicle main controller 70 electrically drives the various actuators in the vehicle 20 such as a travel motor 72, loading and unloading motor 74, and steering motor 75. As a result, the start control relay 56 of the operation permission control device 22 is inserted in the start signal line 77 for inputting the start signal from the key switch 46 to the vehicle main controller 70 and this is opened and closed. Further, the CPU unit 50 is able to learn of the start of usage of the vehicle (and/or the end of usage thereof) by monitoring a predetermined signal 78 which is output by the vehicle main controller 70. So too in the case of a battery-powered vehicle, unless the authentication is successful and the start control relay 56 is ON, the vehicle 20 cannot be started even by operating the key switch 46.

Figure 5:
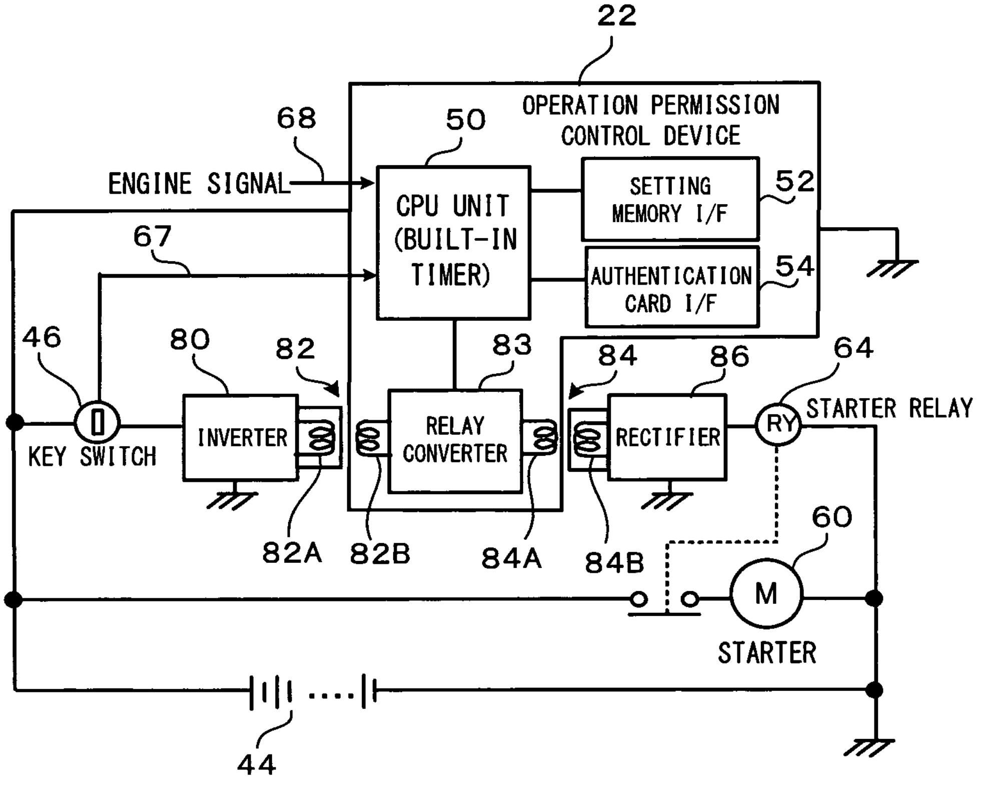
FIG. 5 shows a modified example of the example of the configuration of the interior of the operation permission control device 22 and the connection with the electrical circuit in the vehicle 20.

FIG. 5 shows another example of the configuration of the interior of the operation permission control device 22 and the connection with an electrical circuit in the vehicle 20. Here, the example shown in FIG. 5 is based on the configuration for the case of the engine-driven vehicle shown in FIG. 3 but a similar modification can also be applied to a configuration example of the case of the battery-powered vehicle shown in FIG. 4.

In the example shown in FIG. 5, an inverter 80, a first transformer 82, a relay converter 83, a second transformer 84, and a rectifier 86 are inserted in that order in a cascade in the path for transmitting a start signal from the key switch 46 to the starter relay 64. The inverter 80 converts the start signal (DC current) from the key switch 46 into an AC signal. The first transformer 82 inputs the start signal which is now an AC signal to the relay converter 83. The relay converter 83 exercises control of whether the start signal from the first transformer 82 is input to the second transformer 84 or blocked under the control of the CPU unit 50. That is, the relay converter 83 fulfils the same role as the start control relay 56 shown in FIG. 3 or 4 for the start signal which is an AC signal. When the start signal is input to the second transformer 84, the second transformer 84 inputs the start signal to the rectifier 86. The rectifier 86 converts the start signal into a DC signal and inputs the DC start signal to the starter relay 64, whereby the starter relay 64 turns ON and the vehicle 20 can be started.

Here, the secondary coil 82B of the first transformer 82, the relay converter 83, and the primary coil 84A of the second transformer 84 are housed in the operation permission control device 22. However, the inverter 80, primary coil 82A of the first transformer 82, the secondary coil 84B of the second transformer 84, and the rectifier 86 are disposed in the vehicle 20. That is, where the transmission path for the start signal for starting the vehicle 20 is concerned, the operation permission control device 22 and the electrical circuit in the vehicle 20 are not in electrical terminal contact but are instead connected by means of electromagnetic coupling.

When a configuration in which a signal for starting the vehicle is transferred between the operation permission control device 22 and the vehicle 20 by using electromagnetic coupling is employed, the defensive capability against foul play such as where an unlicensed person tricks the vehicle 20 in order to illegally operate the vehicle 20 improves. That is, one such malignant foul play is so-called 'hotwiring' which produces a circuit state which is identical to a circuit state where the operation permission control device 22 permits operation by using electrical wire to directly link terminals of a connector on the vehicle 20 (25A shown in FIG. 2) which is for linking the electrical circuit in the vehicle 20 with the operation permission control device 22. However, in a configuration that employs the electromagnetic coupling shown in FIG. 5, the interface with the operation permission control device 22 of the vehicle 20 constitutes the coils 82A and 84B of the transformers 82 and 84 and covering the coils 82A and 84B with a resin cover or the like to make them watertight is normal practice. Hence, foul play such as 'hotwiring' mentioned above is extremely difficult.

As an additional modified example, the starter relay 64 is substituted for a relay that does not operate with the voltage from the battery 44 of the vehicle 20 and which does not operate with another voltage (a higher voltage or an AC voltage, for example) and voltage conversion from the voltage of the battery 44 to the operating voltage of the starter relay 64 may be performed using the relay converter 83 in the operation permission control device 22. Thus, because the starter relay 64 does not operate even when the voltage of the battery 44 of the vehicle 20 is forcibly applied to the starter relay 64, illegal operation using 'hotwiring' becomes still more difficult.

Figure 6:
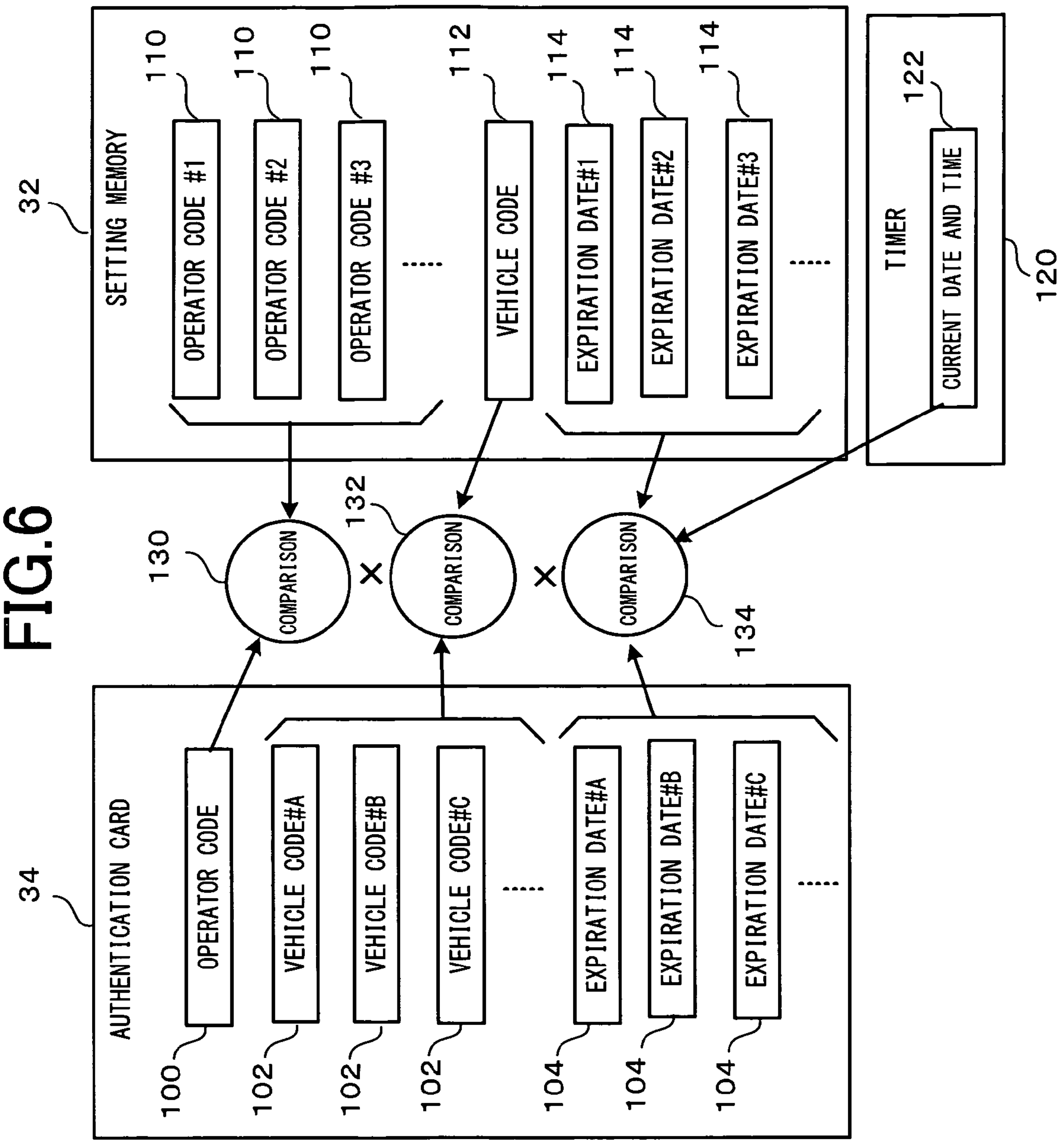
FIG. 6 illustrates the content of vehicle's part authentication data and operator's part authentication data which are stored in a setting memory 32 and authentication card 34 respectively as well as an approach for authentication processing that is carried out by a CPU unit 50 of the operation permission control device 22.

FIG. 6 illustrates the content of vehicle's part authentication data and operator's part authentication data which are stored in a setting memory 32 and authentication card 34 respectively as well as an approach for authentication processing that is carried out by the CPU unit 50 of the operation permission control device 22.

As shown in FIG. 6, the operator's part authentication data recorded in the authentication card 34 owned by an operator include an operator code 100 specifying the operator, the vehicle codes 102, 102, . . . , respectively specifying one or a plurality of vehicles whose operation qualifications are assigned to the operator, and expiration date data 104, 104, . . . respectively indicating the expiration dates of the operation qualifications of the vehicles assigned to the operator. The expiration date data 104, 104, . . . are associated with the corresponding vehicle codes 102, 102, . . . , respectively.

In addition, the vehicle's part authentication data stored in the setting memory 32 which is mounted in the operation permission control device 22 in the vehicle 20 include a vehicle code 112 specifying the vehicle 20, operator codes 110, 110, . . . respectively specifying one or a plurality of operators assigned to the operation qualification of vehicle 20, and expiration date data 114, 114, . . . respectively indicating the expiration dates of the operation qualifications of the vehicle 20 assigned to the respective operators. Furthermore, a timer 122 in the operation permission control device 22 usually counts the current date and time and has current date and time data 122 indicating the current date and time. The expiration date data 114, 114, . . . are associated with the corresponding operator codes 110, 110, . . . , respectively.

The operation permission control device 22 performs operator code comparison processing 130, vehicle code comparison processing 132, and expiration date comparison processing 134 in the authentication processing. In the operator code comparison processing 130, the operator code 100 of the operator who is going to operate the vehicle, which is read from the authentication card 34, is compared with the operator codes 110, 110, . . . of the operators who have the operation qualifications, which are read from the setting memory 32, and it is judged whether a match has been obtained. In the vehicle code comparison processing 132, the vehicle code 100 of a vehicle whose operation qualification is given to the operator who is going to operate the vehicle 20, which is read from the authentication card 34, is compared with the vehicle code 112 of the vehicle 20, which is read from the setting memory 32, and it is judged whether a match has been obtained.

In addition, in the expiration date comparison processing 134, one expiration date data item 114 which is associated with one operator code for which a match is obtained in the operator code comparison processing 130 is selected from among the vehicle's part authentication data of the setting memory 32. Furthermore, one expiration date data item 104 which is associated with one vehicle code for which a match is obtained in the vehicle code comparison processing 132 is selected among the operator's part authentication data of the authentication card 34. Further, both the expiration date data 114 and 104 which are selected are compared with the current date and time data from the timer 120 and it is judged whether the current date and time data are outside the range of either the expiration date data 114 or 104.

Only in cases where a match is obtained in the operator code comparison processing 130, a match is obtained in the vehicle code comparison processing 132, and where it is judged in the expiration date comparison processing 134 that the current date and time is within the ranges of both expiration dates is authentication deemed successful and the startup of the vehicle 20 permitted. In other cases, authentication is considered to have failed and startup of the vehicle 20 is impossible.

Further, as another example, there can also be only one expiration date data item 104 in the authentication card 34 (one expiration date is provided for the operation qualification of one operator irrespective of which vehicle is operated). Likewise, there is only one expiration date data item 114 in the setting memory 32 (that is, irrespective of operators, one expiration date is provided for the operation qualification of one vehicle). Alternatively, either one or both of the expiration date data item 104 in the authentication card 34 and the expiration date data item 114 in the setting memory 32 can also be omitted.

Furthermore, as another example, a code which represents a party to which one or more operators or vehicles belongs (department, company, and so forth) can also be used instead of or in combination with codes that specify individual operators or individual vehicles as the operator code or vehicle code.

In any event, by making it possible to set a plurality of operator codes or a plurality of vehicle codes as mentioned earlier as authentication data, there is an advantage that assignment settings to assign a particular vehicle to a particular operator in a workplace where a plurality of operators and a plurality of vehicles are operating can be made flexibly.

Figure 7:
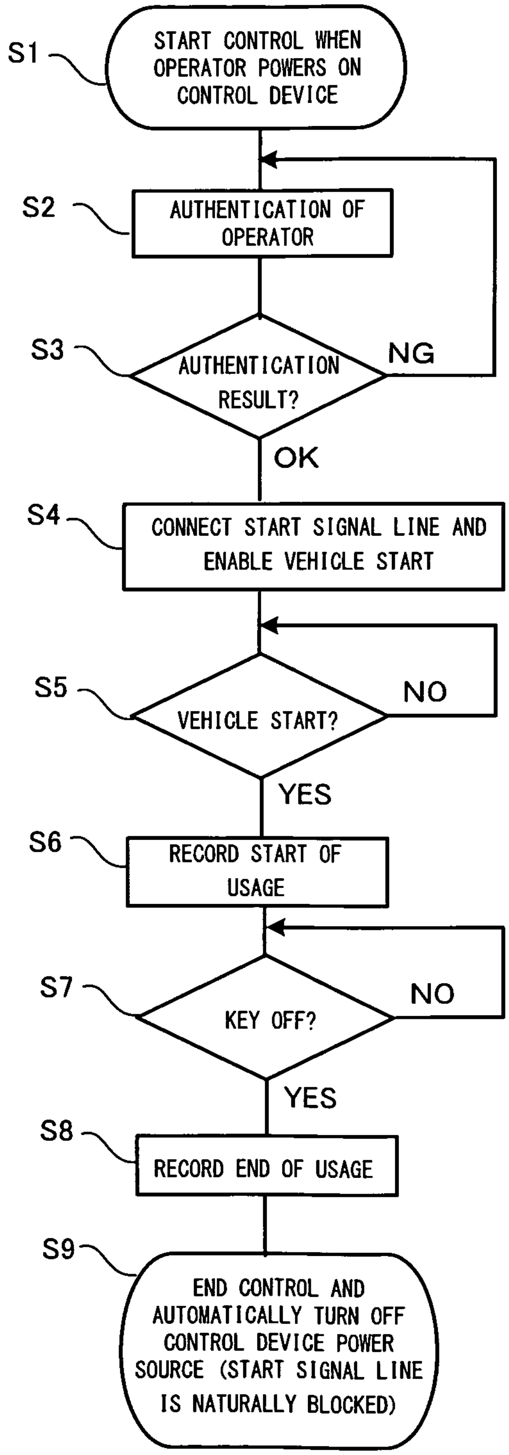
FIG. 7 shows the flow of the operation from power ON until power OFF of the operation permission control device 22.

FIG. 7 shows the flow of the operation from power ON till power OFF of the operation permission control device 22.

As shown in FIG. 7, in step S1, when the power of the operation permission control device 22 is turned ON as a result of operation by the operator, the control operation of the operation permission control device 22 starts. Further, as mentioned earlier, in an initial stage, the operation permission control device 22 is placed in a state where the start signal line of the vehicle 20 is open. In step S2, the operation permission control device 22 starts authentication processing. Thereupon, when the operator holds the authentication card 34 close to the antenna pad 38 of the operation permission control device 22, the operation permission control device 22 reads the operator's part authentication data from the authentication card 34 and then performs authentication processing using the method described with reference to FIG. 6. In step S3, when the authentication result is failure, the control returns once again to step S2, whereupon the operation is not permitted unless the authentication is re-executed and is successful. In step S3, when the authentication result is successful, the control moves to step S4. In step S4, the operation permission control device 22 closes the start signal line of the vehicle 20 and, consequently, the vehicle 20 enters a state where same can be started by operating key switch 46.

Thereafter, the operation permission control device 22 checks whether the vehicle 20 has started in step S5. When it is detected that the vehicle 20 has started, the operation permission control device 22 creates start of usage data which is one form of the usage history data in step S6 and records start of usage data in the setting memory 32. The start of usage data include the usage start date and time data (current date and time data which are obtained from the timer when the start of usage has been detected) and the operator code of the operator (the operator code of the operator matched in the authentication).

Thereafter, the operation permission control device 22 checks whether the key switch 46 has been switched from the ON position to the OFF position (that is, whether usage of the vehicle 20 has finished) in S7. When it is detected that usage of the vehicle 20 has finished, the operation permission control device 22 creates end of usage data which are one form of usage history data and records the end of usage data in the setting memory 32 in step S8. End of usage data include end of usage data date and time data (the current date and time data which are obtained from the timer when the end of usage is detected) and the operator code of the operator (the operator code of the operator matched in the authentication). After the recording of the end of usage data is complete, the operation permission control device 22 automatically turns OFF the power of the operation permission control device 22 in step S9 and, as a result, the start signal line of the vehicle 20 opens and the vehicle 20 enters a state where startup is impossible even when the key switch 46 is operated.

Figure 8:
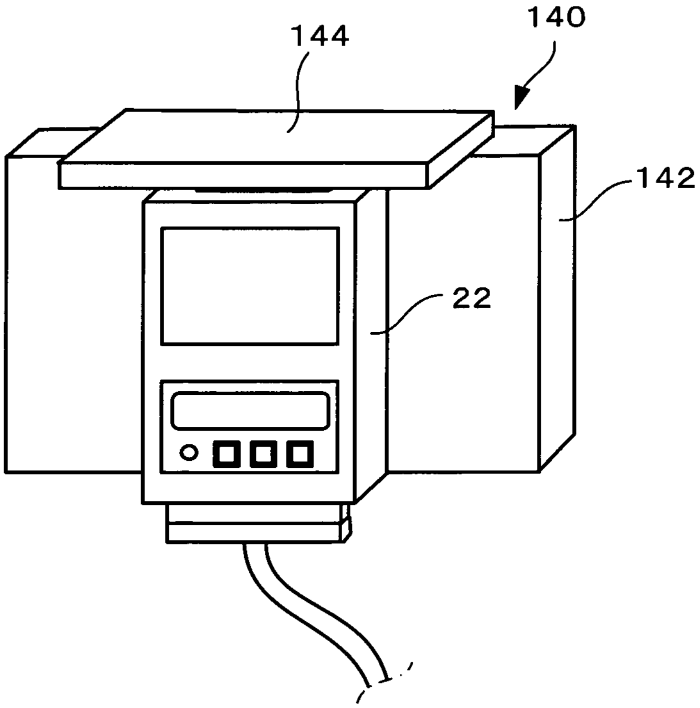
FIG. 8 is a perspective view of a configuration example for attaching the operation permission control device 22 to the vehicle 20.

FIG. 8 shows an example of a structure for attaching the operation permission control device 22 to the vehicle 20.

As shown in FIG. 8, a bracket 142 is fixed in a suitable location of the vehicle main body and the operation permission control device 22 is attached using screws or the like to the bracket 142. The bracket 142 comprises a protective cover 144 that covers the upper surface of the casing of the operation permission control device 22. The protective cover 144 covers the upper surface of the casing of the operation permission control device 22 and, therefore, also covers the setting memory insertion slot (36 shown in FIG. 2) which is provided in the upper surface. As a result, the setting memory 32 cannot be easily removed from the operation permission control device 22 and foul play where the setting memory 32 is removed and copied is problematic. The protective cover 144 also has a function for protecting the operation permission control device 22 during wind and rain and so forth.

The embodiment described hereinabove affords the following advantages. That is, a vehicle permission control function can be added to a vehicle that does not originally have a vehicle permission control function by attaching the operation permission control device by means of simple modification. Because settings can be made such that a plurality of operators are able to operate one vehicle and one operator is able to operate a plurality of vehicles, convenience is high. When a vehicle is not being used, the setting memory can, if necessary, be removed from the operation permission control device or the operation permission control device can be removed from the vehicle and, in so doing, the vehicle cannot be started even when a third party illegally obtains or counterfeits the authentication card. Safety is therefore high. Because rewriting of vehicle's part authentication data in the setting memory is also straightforward, the defensive capability against the illegal procurement or counterfeiting of the authentication card is also high for this reason. Because the vehicle usage history can be automatically recorded, these recordings can be employed in a variety of work management schemes.

Although an embodiment of the present invention was described hereinabove, this embodiment is merely intended as an illustration which serves to explain the present invention, there being no intention to restrict the scope of the present invention to this embodiment alone. The present invention can also be implemented in a variety of other forms without departing from the spirit of the present invention. For example, instead of using a removable recording medium of the kind mentioned hereinabove as the setting memory 32 for storing the vehicle's part authentication data which is fitted in the operation permission control device, a recording medium that is securely attached to the operation permission control device (such as a memory which is built into the CPU unit 50, for example) is used and, vehicle's part authentication data may be written or rewritten to the setting memory 32 from a remote device such as the vehicle management device 26 via wireless communications such as mobile communications. In such a case, although vehicle's part authentication data in the operation permission control device are erased or re-written, because it is possible to perform this operation easily at any time via wireless communications, the defensive capability against the illegal procurement or counterfeiting of the authentication card can be raised still further.

The invention claimed is:

1. An operation permission control device which is provided for use with a machine that has an operating means to be operated by an operator and a starting means for starting the machine in response to the operating means, and which exercises control of whether operation of the machine is permitted, comprising:

a casing which is separate from the machine and which is attachable to and detachable from the machine; and a control circuit which is provided in the casing, wherein the control circuit comprises:

authentication means which receives operator-part authentication data recorded on a portable recording medium from the portable recording medium, and which performs authentication processing by using the operator-part authentication data received from the portable recording medium; and opening and closing means which is configured to be inserted in a signal line in the machine for transmitting a signal that causes the starting means to operate from the operating means to the starting means, and which is configured to open and close the signal line in response to the authentication means, wherein the operation permission control device comprises a setting storage medium which is separated from the portable recording medium, and stores vehicle-part authentication data, the setting storage medium is a removable recording medium which is attachable to and detachable from the operation permission control device, the authentication means performs the authentication processing by using the operator-part authentication data and the vehicle-part authentication data only in cases where the setting storage medium is attached to the operation permission control device, the opening and closing means is configured to be inserted in the signal line via electromagnetic coupling and is configured to transmit the signal using the electromagnetic coupling, the electromagnetic coupling is realized by a first electromagnetic coupling of a first coil prepared in the operation means and a second coil prepared in the opening and closing means, and a second electromagnetic coupling of a third coil prepared in the opening and closing means and a fourth coil prepared in the starting means, and the first coil prepared in the operation means and the fourth coil prepared in the starting means are covered with a resin cover.

2. The operation permission control device according to claim 1, wherein operator codes for a plurality of operators are settable in the operation permission control device as machine's part authentication data;

an operator code for at least one operator is settable in the portable recording medium as operator's part authentication data; and the authentication means performs authentication processing by judging whether a match is obtained between the machine's part authentication data and the operator's part authentication data.

3. The operation permission control device according to claim 1, wherein a machine code for at least one machine is settable in the operation permission control device as machine's part authentication data;

machine codes for a plurality of machines are recordable on the portable recording medium as operator's part authentication data; and the authentication means performs authentication processing by judging whether a match is obtained between the machine's part authentication data and the operator's part authentication data.

4. The operation permission control device according to claim 1, wherein a setting storage medium which is separate from the portable recording medium is attached securely to the operation permission control device;

arbitrary data are writable and rewritable to the setting storage medium and erasable from the setting storage medium by using wireless communications from a remote device; and the authentication means performs the authentication processing by using data recorded on the setting storage medium in addition to the data received from the portable recording medium.

5. The operation permission control device according to claim 1, wherein an operator code for at least one operator is settable in the operation permission control device as machine's part authentication data;

an operator code of at least one operator is settable in the portable recording medium as operator's part authentication data;

the authentication means performs authentication processing by judging whether a match is obtained between the machine's part authentication data and the operator's part authentication data; and the control circuit further comprises usage history recording means that uses an operator code for which a match has been obtained in the authentication processing to create usage history data which indicate which operator has used the machine and records the usage history data.

6. A machine to which the operation permission control device according to claim 1 is attached.

* * * * *